Patented July 26, 1932

1,868,921

UNITED STATES PATENT OFFICE

OTTO SCHMIDT AND OTTO GROSSKINSKY, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF CARBON BLACK

No Drawing. Application filed April 21, 1930, Serial No. 446,167, and in Germany December 31, 1927.

This application is a continuation-in-part of our copending application Serial No. 328,613 filed Dec. 26th, 1928 and relates to an invention for improvements in the manufacture and production of carbon black.

Carbon black has hitherto been almost exclusively produced by the incomplete combustion of hydrocarbons. There are, however, very great drawbacks in this method, because a considerable portion of the initial materials is always burned away in the process, and another portion becomes graphitized by the large amount of heat produced in the combustion, so that, under certain conditions, a considerable amount of the carbon black is rendered unsuitable for finer uses, such as for coloring purposes or in the rubber industry, and the like.

We have now found that these drawbacks are obviated and very high grade carbon black is obtained by dissociating into carbon and hydrogen hydrocarbons of unsaturated character, such as olefines, diolefines, and in particular the gaseous unsaturated hydrocarbons, or gases containing the same, with dehydrogenating catalysts preferably comprising a metal of the iron group which expression includes a compound of the metal reducible to the metallic state under the conditions of working, such as an oxide and a further addition giving increased activity at a low or a moderately elevated decomposition temperature, for example at temperatures of between about 100° and 300° C., but usually at temperatures of between about 300° and 450° C., but, if desired, at temperatures of up to about 600° C. in the gaseous phase, under reduced, ordinary or elevated pressure, and in the presence or absence of other gases or vapors, such as hydrogen, nitrogen, carbon monoxide, carbon dioxide, water vapor, methane, ethane, naphthalene, nitrogen peroxide and the like. Gases consisting of or containing substantial amounts of free oxygen should not be added to the unsaturated hydrocarbons to be converted since in this case not a decomposition by dissociation but a partial combustion would take place. Hydrogen in comparatively small amounts does not exert a hydrogenating action under the conditions of working employed according to our invention because most of the unsaturated hydrocarbons under treatment ultimately undergo decomposition to carbon black and no substantial formation of saturated hydrocarbons takes place by the action of said hydrogen. The said unsaturated hydrocarbons may also be derived from the thermal decomposition or partial combustion of gaseous aliphatic hydrocarbons, such as methane, ethane or propane or of gases containing the same, for example natural gases, such as occur so abundantly in the United States of America. Also other industrial gas mixtures containing considerable amounts of olefines such as oil gas, or gases obtained in cracking or in the low-temperature carbonization of bituminous materials such as brown coal or pit coal, or as a by-product in the production of hydrogen from coke oven gas, if desired, after an enrichment in olefines and if desired, after a removal of the butadiene suitable for other purposes are very suitable initial materials for application in the process according to the present invention.

If elevated pressures be employed, these may be somewhat higher than atmospheric or may be, for example, of the order of 30, 50, 100 or even more atmospheres.

Cobalt oxide, nickel oxide or iron oxide and the like may be employed with particular advantage for the production of the catalyst by reduction. Suitable additions comprise, for example, metal oxides or hydroxides, such as cadmium oxide, copper oxide, vanadium oxide, chromic oxide, zinc oxide, uranium oxide, alumina, manganous oxides, thorium oxide, caustic alkalies, and the like, or salts, such as silicates, chromates, molybdates, tungstates, or the like. As excellent catalysts may be mentioned catalysts containing cobalt, which may be obtained by reduction of compounds of cobalt with hydrogen at a moderately elevated temperature, and which may be provided with activating additions, such as the oxides or hydroxides of zinc, cadmium, copper, chromium, vanadium, molybdenum, uranium and the metals of the alkalies and the alkaline earths. The catalysts may be employed in a homogeneous state or in conjunction with carriers. Catalysts which have been subjected to a moulding process are advantageous.

Among the unsaturated hydrocarbons, the olefines, such as ethylene and its homologues, are particularly suitable, but diolefines, such as butadiene and its homologues, may also be used as the initial materials and saturated hydrocarbons, such as ethane, propane, benzine fractions and the like may also be added. It is often advisable to take care that the carbon black formed during the decomposition is removed from the reaction chamber as quickly as possible. This is most easily effected by mechanical means, though the removal may also be effected by maintaining the highest possible gas velocity in the reaction zone. Useful carbon black may, however, also be produced without these precautionary measures.

Particularly excellent results are obtained according to this method of working with catalysts containing cobalt. The carbon black obtained according to this method of working is distinguished by its particles having a very small size, that is to say, of its having a very fine state of dispersion. On this account it has a very deep black color and is suitable as an admixture in the vulcanization of rubber articles such as are produced both from crude rubber and from the plastic or resilient polymerization products of diolefines.

Care should be taken that any substantial increase of the temperature in the catalyst chamber above the optimum value is prevented. The optimum temperature for the catalytic preparation of carbon black from ethylene for example lies between about 370° to 380° centigrade for most catalysts. It is essential, for the production of a very valuable carbon black that the said temperature is not substantially exceeded. With some catalysts the permissible upper limit of the temperature lies higher, namely when working with dilute gases, but generally speaking the temperatures should not exceed from 450° to 500° centigrade. The leading away of the undesirable amounts of heat from the reaction chamber may be effected in any manner as for example by metallic masses arranged in the reaction chamber, by heat reflection of the said masses or by other cooling apparatus, as for example those which are kept at a certain temperature by hot water under pressure. The injurious increase in temperature may also be prevented by leading gases at a lower temperature into the reaction chamber at a given time or by working with dilute gases or by only effecting a partial conversion in the reaction chamber at first, as for example by introducing the powdered catalyst in measured amounts, and by introducing the gas into the reaction chamber a second time in order to complete the conversion. As diluents for the compounds to be decomposed may be mentioned for example nitrogen, water vapor, carbon dioxide and also in some cases saturated hydrocarbons such as methane, ethane and the like.

The carbon black produced by the decomposition of unsaturated hydrocarbons according to the process of the present invention, and in particular that obtained in the presence of catalysts containing cobalt, is adapted for the production of colored compositions, such as printing inks, endorsing inks and the like, and as already stated, also for use in the rubber industry. The said carbon black is very similar in its properties to that obtained by partial combustion of hydrocarbons, and is thus considerably superior in its properties to the carbon blacks which have hitherto been obtained by other processes of thermal decomposition. Moreover, since the carbon black prepared in this manner is far more easily and conveniently obtainable than that hitherto prepared by partial combustion, its application for the said purposes constitutes a substantial technical improvement.

The catalysts employed according to the present invention often have a greater length of service than catalysts not provided with additions. Furthermore, a carbon black of improved quality is obtained with a better yield. The said catalysts have an increased activity.

The following examples will further illustrate how the said invention may be carried out in practice, though it is understood that the invention is not limited to these merely typical examples. The parts are by weight unless otherwise stated.

*Example 1*

A mixture of 2 parts by volume of ethylene with an addition of 1 part by volume of hydrogen, compressed at 90 atmospheres is passed, at a temperature of about 100° C. over a catalyst composed of finely divided nickel deposited on kieselguhr. The ethylene decomposes, with violent liberation of heat and an increase in pressure, into methane and carbon, the latter being obtained in the form of a valuable carbon black, practically free from nickel. The amount of the hydrogen originally employed suffers practically no change, and there is practically no ethane present in the reaction gases. In this case also, care must be taken, by cooling, to prevent the rise in temperature becoming excessive.

Other diluents, such as carbon monoxide, carbon dioxide, steam, methane, nitrogen, and the like, may also be employed.

The nickel may also be replaced by cobalt or iron or the like which, when employed in a fine, coarse or activated condition, also furnish good results. The formation of carbon black can also be effected by adding small amounts of nickel carbonyl, iron carbonyl, or other volatile compounds of metals of the iron group and heating. The carbon black thus obtained is deep black in color and 100 cubic centimeters of the loosely heaped product weigh about 10 grams. The product has the property of imparting a particularly high elasticity to rubber or polymerization products of diolefines when employed as an admixture therewith.

Thus, if 100 parts of a plastic polymerization product of butadiene together with 25 parts of magnesium oxide, 5 parts of sulphur and 0.5 part of a vulcanizing accelerator be intimately mixed with 40 parts of the carbon black prepared from ethylene in the manner described and the resulting sheet be vulcanized for 15 minutes at about 140° C., a technically valuable vulcanizate of high elasticity is obtained.

Example 2

A mixture of 99 parts of cobalt oxide with 1 part of zinc oxide (obtained by precipitation of a solution of a mixture of the nitrates) is shaped by pressing and reduced with hydrogen at a temperature of 330° C. A mixture of 50 parts by volume of ethylene and 50 parts by volume of added methane is passed over this catalyst at a temperature of 400° C. in a not too rapid current. The carbon which separates out consists of a very deep black carbon black, the size of the crystallites of which is smaller than 100 Angström units in diameter.

Example 3

99 per cent ethylene is led over a catalyst which has been obtained by reduction at moderate temperatures of a mixture of cobalt oxide, zinc oxide and barium oxide which contains 50 parts of cobalt, 50 parts of zinc and 1 part of barium. The catalyst is in a chamber which, at the place where the catalyst is situated, is constructed as a double walled tube having a semicircular cross section which is kept at a temperature of from 350° to 370° centigrade by means of hot water under pressure. Means are provided in the chamber which permit of removing from the chamber from time to time the carbon black formed, as well as of supplying fresh catalyst if necessary. The support for the catalyst is provided with a device for measuring the temperature. The velocity of flow of the ethylene is selected so that the reaction temperature, measured to the catalyst, lies between 370° and 380° centigrade. The resulting carbon black is freed from adherent metallic impurities by boiling up with dilute hydrochloric acid or nitric acid. It has an excellent blackness and printing power and is also eminently suitable for the manufacture of rubber. For both purposes it approximates very closely in quality to good American gas black.

Example 4

24.65 parts of cobalt nitrate, 22.75 parts of zinc nitrate and 0.19 part of barium nitrate (Co : Zn : Ba = 50 : 50 : 1) are dissolved in 120 parts of water. The solution thus obtained is atomized at ordinary temperature into a 2n— solution of alkali metal carbonate or of ammonium carbonate which solution is present in an amount sufficient to cause precipitation of the said metals. The carbonates thus precipitated are carefully washed, dried, heated to a temperature not exceeding 400° C., ground, made up into a stiff paste, brought into a suitable shape, and are then again heated to a temperature not exceeding 400° C. The mixture of oxides thus obtained is reduced in a current of hydrogen at a temperature of between about 320° and 350° C. Over the catalyst thus obtained, 5 liters of a gas mixture consisting of 50 per cent by volume of ethylene, 40 per cent by volume of nitrogen and 10 per cent by volume of air are passed hourly for each gram of the catalyst present. Over 70 per cent of the carbon contained in the ethylene is obtained in the form of a deep black carbon black.

If carbon monoxide be added to the ethylene in place of the mixture of air and nitrogen aforementioned, for example in the ratio of 1 : 1, the carbon monoxide acts not only as a diluent, but also increases the yield of carbon black obtained by itself being in part decomposed into carbon black and carbon dioxide. Other gases such as methane, ethane, nitrogen and the like may be added to the said gas mixtures containing carbon monoxide and carbon dioxide. If methylacetylene be employed as the initial material, the said unsaturated hydrocarbon is preferably diluted with water vapor and carbon dioxide. In this case a temperature of between about 350° and 400° C. is maintained in the catalyst chamber.

Example 5

A mixture of zinc carbonate and cobalt carbonate is precipitated from a solution containing zinc chloride and cobalt chloride in equimolecular proportions by means of a solution of ammonium bicarbonate or of an alkali metal carbonate. The precipitate which has been freed from combined chlorine is dried at a temperature of between about 90° and 100° C., ground somewhat and is then made up into a paste with so many cubic centimeters of a solution of potassium hydroxide that 2 atoms of potassium are present for each 100 atoms of cobalt. After thoroughly kneading the paste the carbonates are formed and dried at a temperature of about 100° C. The dried carbonates are heated for about 24 hours in a current of hydrogen to a temperature of about 350° C. 25 liters of propylene are then passed over the catalyst hourly at a temperature of about 380° C., for each 10 grams of the catalyst. More than 70 per cent of the carbon contained in the propylene is obtained as carbon black. The addition of alkali metal salts of hydroxides to the catalyst has a beneficial influence on the quality of the carbon black obtained. Above all, readily decomposable alkali metal salts, such as cyanides, nitrates, nitrides and the like are suitable additions. Also complex salts, in particular such containing a metal of the iron group as a central atom, for example the sodium salt of nitroprussic acid are excellently suitable as additions. In cases where ammonium carbonate is employed as the precipitating agent larger amounts of alkali metal salts or hydroxides should be added than is otherwise the case. The catalysts may also be prepared in the manner described in Example 4 and the additions of alkali metal salts may be made after the first heating of the carbonates to a temperature of 400° C.

In the above examples the proportions of the constituents of the catalyst may be varied.

Example 6

60 parts of cobalt carbonate and 80 parts of zinc oxide are mixed and are made up into a paste with dilute aqueous ammonia containing 1 part by weight of potassium nitride in solution. The paste is worked up for 24 hours in a ball mill, after it has been dried by heating to a temperature of 325° C. and reduced in a current of hydrogen. On passing a mixture of ethylene, propane and butylene obtained by cracking over the said catalyst at 400° C. a carbon black is obtained which is very suitable for employment in the vulcanization of rubber or of polymerization products of butadiene.

Thus, for example, if 100 parts of a polymerization product of butadiene be mixed on the roller with 70 parts of carbon black obtained according to the foregoing example, 5 parts of zinc oxide, 7 parts of stearic acid, 2 parts of sulphur, 0.6 part of hexenyl piperidine, 1.5 parts of diphenylguanidine and 1 part of aldol-α-naphthylamine and this mixture be vulcanized at 140° C. a vulcanization product is obtained having excellent properties rendering it suitable for application for technical purposes.

Example 7

152 parts by weight of ferrous chloride, 145 parts of 70 per cent zinc chloride, 1.75 parts of barium chloride are dissolved in 2500 parts of hot water. The said salts are precipitated in the form of carbonates by causing the said solution to flow at a temperature of about 30° C. into an amount of a solution of ammonium bicarbonate sufficient to cause complete precipitation. The precipitate is washed until it is free from chlorine and is then made up into a paste with a solution of 3 parts by weight of potassium nitride in water and is dried. The product thus obtained is reduced at a temperature of 350° C. and ethylene is passed over the catalyst thus produced at a temperature of about 440° C. A good yield of carbon black is obtained and the aforesaid gases contain only a little methane and ethane. Several metals of the iron group may also be combined in one catalyst. Thus a combination of nickel, iron and zinc is active already at a lower temperature than the aforesaid catalyst.

Example 8

A mass prepared by pressing a mixture of 97 parts of nickel oxide, 2 parts of iron oxide and 1 part of molybdic acid is arranged in an iron tube. A mixture of nitrogen and hydrogen is passed through the said tube which is heated to a temperature of about 350° C. until the mass contained therein is reduced. A mixture consisting of 50 per cent by volume of acetylene and 50 per cent by volume of water vapor is passed through the tube at a temperature of 350° C. The acetylene is completely decomposed and a carbon black having good properties is obtained. Diolefines, such as butadiene or mixtures thereof with one another or with olefines may be converted into carbon black in a similar manner.

What we claim is:

1. A process for the production of carbon black from olefinic hydrocarbons, which comprises decomposing by dissociation the said initial material in the gaseous phase with a dehydrogenating catalyst comprising a metal of the iron group and a further addition giving increased activity at a low to moderately elevated decomposing temperature not exceeding about 600° C.

2. A process for the production of carbon black from olefinic hydrocarbons, which comprises decomposing by dissociation the said initial material in the gaseous phase with a dehydrogenating catalyst comprising a metal of the iron group and a further addition giving increased activity at a temperature of between about 100° and 600° C.

3. A process for the production of carbon black from olefinic hydrocarbons, which comprises decomposing by dissociation the said initial material in the gaseous phase with a dehydrogenating catalyst comprising a metal of the iron group and a further addition giving increased activity at a temperature of between about 300° and 450° C.

4. A process for the production of carbon black from olefinic hydrocarbons, which comprises decomposing by dissociation a gas comprising the said initial material in the gaseous phase with a dehydrogenating catalyst comprising a metal of the iron group and a further addition giving increased activity at a low to moderately elevated decomposing temperature not exceeding about 600° C.

5. A process for the production of carbon black from olefinic hydrocarbons, which comprises decomposing by dissociation a gas comprising the said initial material in the gaseous phase with a dehydrogenating catalyst comprising a metal of the iron group and a further addition giving increased activity at a temperature of between about 100° and 600° C.

6. A process for the production of carbon black from olefinic hydrocarbons, which comprises decomposition by dissociation a gas comprising the said initial material in the gaseous phase with a dehydrogenating catalyst comprising a metal of the iron group and a further addition giving increased activity at a temperature of between about 300° and 450° C.

7. A process for the production of carbon black from olefinic hydrocarbons, which comprises decomposition by dissociation the said initial material in the gaseous phase with a dehydrogenating catalyst comprising a metal of the iron group and a further addition of a metal oxide giving increased activity at a temperature of between about 300° and 450° C.

8. A process for the production of carbon black from ethylene, which comprises decomposition by dissociation the said initial material at a temperature of between about 300° and 450° C. with a catalyst comprising cobalt and a metal oxide having an activating effect.

9. A process for the production of carbon black from ethylene, which comprises passing a gas comprising ethylene and which does not contain substantial amounts of free oxygen at a temperature of about 400° C. over a catalyst prepared from a mixture comprising cobalt oxide and zinc oxide.

In testimony whereof we have hereunto set our hands.

OTTO SCHMIDT.
OTTO GROSSKINSKY.